April 28, 1925.  
F. E. SMALL  
1,535,552  
PISTON PACKING RING  
Filed April 4, 1924
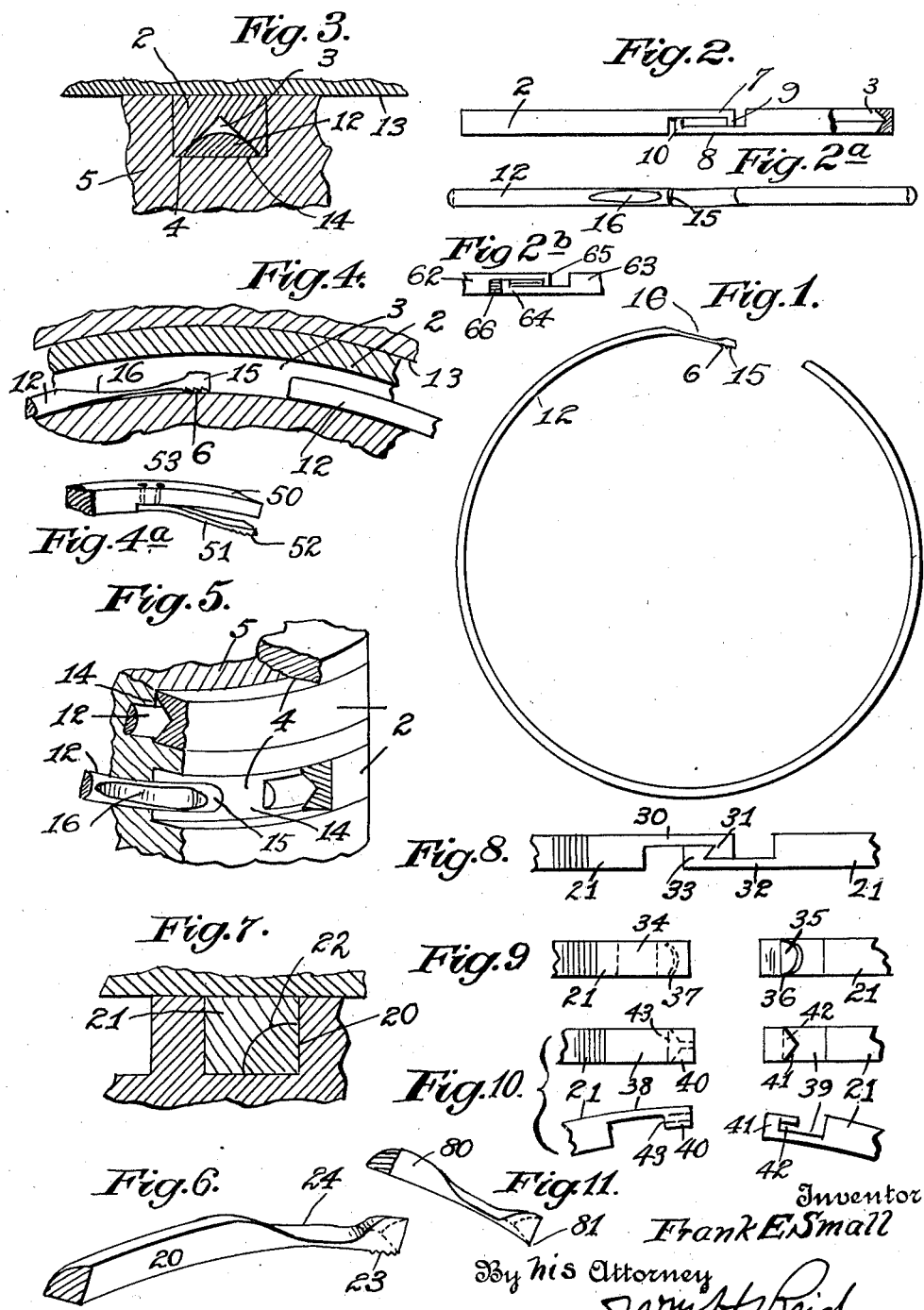

Patented Apr. 28, 1925.

1,535,552

UNITED STATES PATENT OFFICE.

FRANK E. SMALL, OF JAMAICA, NEW YORK, ASSIGNOR TO NANCY MARIA SMALL, OF JAMAICA, LONG ISLAND, NEW YORK.

PISTON PACKING RING.

Application filed April 4, 1924. Serial No. 704,184.

*To all whom it may concern:*

Be it known that I, FRANK E. SMALL, a citizen of the United States, and a resident of Jamaica, L. I., in the county of Queens and State of New York, have invented certain new and useful Improvements in Piston Packing Rings, of which the following is a specification.

The present invention relates to packing rings for pistons, especially designed for the use in internal combustion engines. The packing is of the type of a split metal ring placed in a groove in the piston and pressed outwardly to engage the wall of the cylinder, with means for maintaining such engagement notwithstanding wear of both the wall of the cylinder and of the ring itself.

The object of the present invention is to provide a packing ring comprising an outer packing ring and an inner spring ring, with a special means on the inner face of the spring ring at one portion that will cause it to frictionally engage the bottom wall of the groove.

In the accompanying drawing showing embodiments of my invention,

Fig. 1 is a side view of the inner ring.

Fig. 2 is a plan partially in section of the outer ring.

Fig. 2ª shows the inner ring.

Fig. 2ᵇ shows another lock joint.

Fig. 3 is a cross section, enlarged through the rings showing the piston and cylinder.

Fig. 4 is a longitudinal section of the same.

Fig. 4ª shows another friction end portion.

Fig. 5 is a perspective view broken away.

Fig. 6 shows a modified form of inner ring.

Fig. 7 shows the latter in use in section.

Figs. 8, 9 and 10 show different locked joints for the outer ring.

Fig. 11 shows another friction end portion.

This invention relates to the inner spring ring used in connection with an outer packing ring, and is adapted for use with any desired form of packing ring; and is shown in Figs. 1–6 in connection with an outer packing ring 2 having angular groove 3 on the inner face, which ring is shown placed in the groove 4 in a piston 5, and extends from side to side of the piston groove. This ring 2 is split, and preferably has a locked joint as indicated in Fig. 2, in which each end portion is reduced, to form tongues 7 and 8, having heads or lugs 9 and 10, extending inwardly toward the opposite tongues, that will limit the expansion of the ring in the groove.

In the groove 3 of the packing ring is placed a suitable spring ring 12, see Fig. 1, that in this case is flat on the inner face, and rounded or curved on the outer face to engage the inclined wall of the groove 3 in the packing ring, as clearly shown in Fig. 5. This ring is split, and the ends will not quite meet when in position in the piston groove. One of these ends is deflected inwardly a short distance so that when the ring is placed in the piston groove and pressed down in the groove and the cylinder wall 13 engages the packing ring, this inner wall of the spring ring at its end will have a strong frictional engagement with the bottom wall 14 of the piston groove. As shown I provide the end portion 15 of the ring 12 with a roughened spot 6, such as by file cutting or other form of a roughened face or portion of the ring, that is bent inwardly as indicated in Fig. 1 in its normal position when free.

To facilitate the springing inward of this end portion of the ring, it is flattened or reduced for a short distance back from the extremity preferably by cutting or grinding away one face of the ring as at 16, leaving the ring full size at end portion. This will facilitate the bending of the ring, and will force the roughened face inwardly under spring pressure.

In operation, this inner ring is first placed in the groove in the piston, and when the packing ring 2 is applied, it will force the spring ring to the bottom of the groove and bring its end portions together, not quite in contact. The outer ring is locked by the tongues as indicated in Fig. 2, which are caused to lap one on top of the other to engage, that when forced outwardly by the spring ring will still hold the outer ring in the groove, as these heads interlock to prevent more than a small outward movement of these ends. When the piston with these rings is placed in the cylinder, the packing ring will be forced inwardly and compress the spring end of the inner ring, whereby the roughened end portion will tend to be forced outwardly by the bottom wall of the groove, that will cause a tight engagement of this roughened spot or end with the bottom wall of the piston groove. This contact will be maintained, even should the outer ring wear away and move outwardly, because the spring bend in the inner ring will preserve the tension. When these rings are applied the joint of the outer ring is placed on the opposite side of the piston from the joint of the inner ring, so that the joint in the outer ring will be closed by the inner ring and tend to prevent escape of gas or oil. This relative position of the joints will be maintained in operation because the inner ring is prevented from creeping by its friction at spot 6.

In Figs. 6 and 7 I show another form of the inner ring substantially quadrant shape in section, the ring 20 being placed in a similar shape groove 22 in packing a ring 2. This inner ring 20 is provided with a roughened spot 23 on its inner end and is reduced in thickness at 24, corresponding with the other form of ring.

In Fig. 8 I show another form of locked joint for the outer ring, in which ring 21 is provided with tongues 30 and 32 having undercut heads 31 and 33 that will prevent separation of the ring ends brought together in the piston; but will permit the ends to approach when the piston is placed in the cylinder.

In Fig. 9 ring 21 is shown provided with tongues 34 and 35 having the engaging head portions 37 and 38 curved, being convex in one and concave in the other, that will prevent lateral separation when brought together in the groove.

In Fig. 10 the ring is provided with tongues 38 and 39 having heads 40 and 41, the latter being angular as shown in 42, to enter an angular socket 43 in the head 40. This also will prevent lateral separation of the ring.

In Fig. 4ª I show an inner ring 50, that has a strip 51 secured by rivets in a reduced inner face and is of a thickness and size to fill this removed portion. This strip is preferably resilient to spring inwardly, and has its inner face at the end 52 roughened to engage the bottom wall of the piston groove similar to the roughened end 23 of the other ring. When this ring is placed in groove and pressed downwardly, this strip 51 will be bent into its groove, and will tend to spring out of the groove to force the ring 50 outward, and hence, when the rings are in place with the piston in the cylinder, this roughened end will have a strong frictional engagement with the bottom wall of the groove and prevent shifting of this ring in the piston groove.

Another form of inner ring is shown in Fig. 11 where the end of the inner ring 80 has a roughened edge 81 that may be formed by upsetting this end or giving it a blow at this portion that will cause a roughened projection on the inner part of the ring.

Fig. 4 shows a form of locking ends similar to Fig. 2, except that the end 62 has a slot 63 with an abutment 64 at the end, which slot receives the tongue 65 with the head 66, on the other end 67. This construction being closed by the slot wall 63, will prevent escape of the gas and oil through the ring.

What I claim is:

1. A piston packing ring comprising an outer split ring and an inner split ring of resilient material, said rings having cooperating faces whereby the inner ring will press the outer ring outwardly in the piston groove, said inner ring being roughened on the inner face and deflected inwardly to frictionally engage the bottom wall of the piston groove to prevent creeping of the ring in the groove.

2. A piston packing ring comprising an outer split ring and an inner split ring of resilient material, said rings having cooperating faces whereby the inner ring will press the outer ring outwardly in the piston groove, said inner ring being reduced laterally at a spot a short distance from one end to increase its resiliency, such end being roughened on the inner face and deflected inwardly to frictionally engage the bottom wall of the piston groove to prevent creeping of the ring in the groove.

3. A piston packing ring comprising an outer split ring and an inner split ring of resilient material, said rings having cooperating faces whereby the inner ring will press the outer ring outwardly in the piston groove, said inner ring having one end reduced laterally to increase its resiliency, such end being roughened on the inner face and deflected inwardly to frictionally engage the bottom wall of the piston groove to prevent creeping of the ring in the groove.

4. A piston packing ring comprising an outer split ring and an inner split ring of resilient material, said rings having cooperating faces whereby the inner ring will press the outer ring outwardly in the piston groove, said inner ring having one end reduced laterally to increase its resiliency, such end being deflected inwardly to frictionally engage the bottom wall of the piston groove to prevent creeping of the ring in the groove.

5. A piston packing ring comprising an outer split ring and an inner split ring of resilient material, said rings having cooperating faces whereby the inner ring will press the outer ring outwardly in the piston groove, said inner ring being reduced laterally at a spot a short distance from one end to increase its resiliency and deflected inwardly to frictionally engage the bottom wall of the piston groove to prevent creeping of the ring in the groove.

6. A piston packing ring comprising an outer split ring and an inner split ring of resilient material, said rings having cooperating faces whereby the inner ring will press the outer ring outwardly in the piston groove, said inner ring provided with interlocking end portions adapted to engage on insertion to permit a limited outward movement of the ring, said inner ring being also provided with a roughened inner face at one end arranged to frictionally engage the bottom wall of the piston groove to prevent creeping of the ring in the groove.

Signed at New York city, N. Y., on March 31, 1924.

FRANK E. SMALL.